United States Patent [19]

Takekawa et al.

[11] Patent Number: 5,081,451
[45] Date of Patent: Jan. 14, 1992

[54] DISPLAY SYSTEM FOR USE IN VEHICLE

[75] Inventors: Yoriyuki Takekawa; Hidekazu Oshizawa, both of Higashimatsuyama, Japan

[73] Assignee: Diesel Kiki Co., Ltd., Tokyo, Japan

[21] Appl. No.: 422,526

[22] Filed: Oct. 17, 1989

[30] Foreign Application Priority Data

Oct. 20, 1988 [JP] Japan .................. 63-262964

[51] Int. Cl.⁵ .............................................. G09G 3/22
[52] U.S. Cl. .................................... 340/774; 340/781; 340/813
[58] Field of Search ............... 340/767, 774, 781, 813, 340/793; 315/299, 301, 308, 158, 149, 77, 80, 169.,1, DIG. 4; 307/10.8; 362/23; 236/DIG. 8

[56] References Cited

U.S. PATENT DOCUMENTS

| 3,885,230 | 5/1975 | Merk | 315/169.1 X |
| 4,358,713 | 4/1982 | Senoo et al. | |
| 4,682,084 | 7/1987 | Kuhnel et al. | 315/158 X |
| 4,697,122 | 9/1987 | Hoffer | 315/DIG. 4 X |
| 4,868,459 | 9/1989 | Dennerlein et al. | 315/77 X |

FOREIGN PATENT DOCUMENTS

| - 133653 | 11/1975 | Japan . |
| 118109 | 7/1985 | Japan . |
| 60-142731 | 7/1985 | Japan . |
| 61-71215 | 4/1986 | Japan . |
| 180805 | 4/1986 | Japan . |
| 62-112910 | 7/1987 | Japan . |

Primary Examiner—Ulysses Weldon

[57] ABSTRACT

A display system for a vehicle is provided with a fluorescent display tube. An anode control circuit outputs a control signal for selecting one or more of anode electrodes of the display tube to output a first control signal in response to which the selected anode electrodes are supplied with a positive voltage to cause the flourescent display tube to make a display. A display condition judging circuit judges whether or not the anode control circuit is outputting the first control signal. A brightness judging circuit judges whether the surroundings of the fluorescent display tube are bright or dark. A filament control circuit outputs a second control signal for energizing a filament of the display tube when said display condition judging circuit judges that the anode control circuit is outputting the first control signal and/or when the brightness judging circuit judges that the surroundings of the display tube are bright. The filament control circuit ceases to output the second control signal when the anode control circuit does not output the first control signal and at the same time when the brightness judging circuit judges that the surroundings of the display tube are dark.

4 Claims, 4 Drawing Sheets

DISPLAY SYSTEM FOR USE IN VEHICLE

BACKGROUND OF THE INVENTION

This invention relates generally to a display system for use in a vehicle, and more particularly to such a display system provided with a fluorescent display tube.

A display system of the type described is used, for example, to indicate or display a set temperature of an air conditioner or the like. There is known such a display system provided with a fluorescent display tube which provides a display clearly visible day and night.

Such a fluorescent display tube comprises a filament coated with an electron-emitting substance, and a plurality of anode electrodes each coated with a fluorescent substance. When the filament is energized and heated, the electron-emitting substance emits the electrons. When a positive voltage is applied to selected one or more of the anode electrodes, the electrons emitted from the electron-emitting substance move toward the selected anode electrodes and collide with the fluorescent substance coated on these anode electrodes. At this time, visible rays of light are emitted from the fluorescent substance to make a required display. Thus, in order to cause the fluorescent display tube to make a display, it is necessary that the electrons be emitted by the energization and heating of the filament.

The conventional display systems provided with such a fluorescent display tube are generally classified into two types. Specifically, in one type, the filament is always kept energized regardless of whether the display system is in a display condition or a non-display condition. In the other type, the filament is energized only in a display condition of the display system, and is kept de-energized in a non-display condition of the display system. The former type is shown in FIG. 1 of Japanese Laid-Open (Kokai) Patent Application No. 142731/85, and the latter type is shown in FIGS. 2 and 3 of this Japanese Laid-Open application.

In the case where the display system of the former type is used in a vehicle, there is encountered a problem that the red-hot filament is viewed in the night in a non-display condition of the display system, and therefore is an eyesore to the driver. Moreover, in this case, when the display system is switched to a display condition (that is, voltage is applied to the anode electrodes), the anode electrodes immediately emit a sufficient amount of visible light to make a bright display since the filament has been preheated red-hot. This is disadvantageous in that a great stimulus is given to the eyes of the driver which have been accustomed to the darkness.

In the display system of the latter type when it is switched from a non-display condition to a display condition, sufficient quantities of electrons are not produced before the filament becomes hot-red, and therefore the amount of visible light emitted from the fluorescent substance is insufficient. This is disadvantageous particularly in the daytime in that the display is unclear.

With respect to other prior art, Japanese Laid-Open Utility Model Application No. 112910/87 discloses a mode selection switch used in an air conditioner, and Japanese Laid-Open Patent Application No. 71215/86 discloses a sensor for detecting the intensity of the sunlight which is used as one of data for controlling the operation of an air conditioner.

SUMMARY OF THE INVENTION

It is therefore an object of this invention to provide a display system for a vehicle which can make a filament less conspicuous at night in a non-display condition of the display system, and can optimize the display made immediately after the display system is switched from a non-display condition to a display condition.

According to one aspect of the present invention, there is provided a display system for use in a vehicle, comprising:

(a) a fluorescent display tube including a filament coated with an electron-emitting substance, and anode electrodes each coated with a fluorescent substance, the electrons being emitted from the electron-emitting substance when the filament glows;

(b) means for generating display data;

(c) a filament drive circuit for energizing the filament to cause the same to glow;

(d) anode control means for selecting one or more of the anode electrodes in accordance with the display data to output a first control signal;

(e) an anode drive circuit responsive to the first control signal for applying a positive voltage to the selected anode electrodes, so that the electrons emitted from the electron-emitting substance move toward the selected anode electrodes to collide with the fluorescent substance on the selected anode electrodes to produce visible rays of light, thereby causing the fluorescent display tube to make a display;

(f) display condition judging means for judging whether or not the anode control means is outputting the first control signal;

(g) brightness judging means for judging whether the surroundings of the fluorescent display tube are bright or dark; and (h) filament control means for outputting to the filament drive circuit a second control signal for energizing the filament, (i) the filament control means outputting the second control signal when the display condition judging means judges that the anode control means is outputting the first control signal and/or when the brightness judging means judges that the surroundings of the fluorescent display tube are bright, (ii) the filament control means ceasing to output the second control signal when the display condition judging means judges that the anode control means does not output the first control signal and at the same time when the brightness judging means judges that the the surroundings of the fluorescent display tube are dark.

According to another aspect of the invention, there is provided a display system for use in combination with an air conditioner used in a vehicle, comprising:

(a) a fluorescent display tube including a filament coated with an electron-emitting substance, and anode electrodes each coated with a fluorescent substance, the electrons being emitted from the electron-emitting substance when the filament glows;

(b) means for generating data representative of the condition of the operation of the air conditioner;

(c) a filament drive circuit for energizing the filament to cause the same to glow;

(d) display instruction means for outputting a display instruction signal;

(e) anode control means responsive to the display instruction signal during the operation of the air conditioner so as to select one or more of the anode electrodes in accordance with the data to output a first control signal;

(f) an anode drive circuit responsive to the first control signal for applying a positive voltage to the selected anode electrodes, so that the electrons emitted from the electron-emitting substance move toward the selected anode electrodes to collide with the fluorescent substance on the selected anode electrodes to produce visible rays of light, thereby causing the fluorescent display tube to display the condition of the operation of the air conditioner;

(g) display condition judging means for judging whether or not the display instruction means is outputting the display instruction signal;

(h) brightness judging means for judging whether the surroundings of the fluorescent display tube are bright or dark; and (i) filament control means for outputting to the filament drive circuit a second control signal for energizing the filament, (i) the filament control means outputting the second control signal when the display condition judging means judges that the display instruction means is outputting the display instruction signal and/or when the brightness judging means judges that the surroundings of the fluorescent display tube are bright, (ii) the filament control means ceasing to output the second control signal when the display condition judging means judges that the display instruction means does not output the display instruction signal and at the same time when the brightness judging means judges that the surroundings of the fluorescent display tube are dark.

DESCRIPTION OF THE PREFERRED EMBODIMENTS OF THE INVENTION

The invention will now be described with reference to the drawings.

Figure 1:
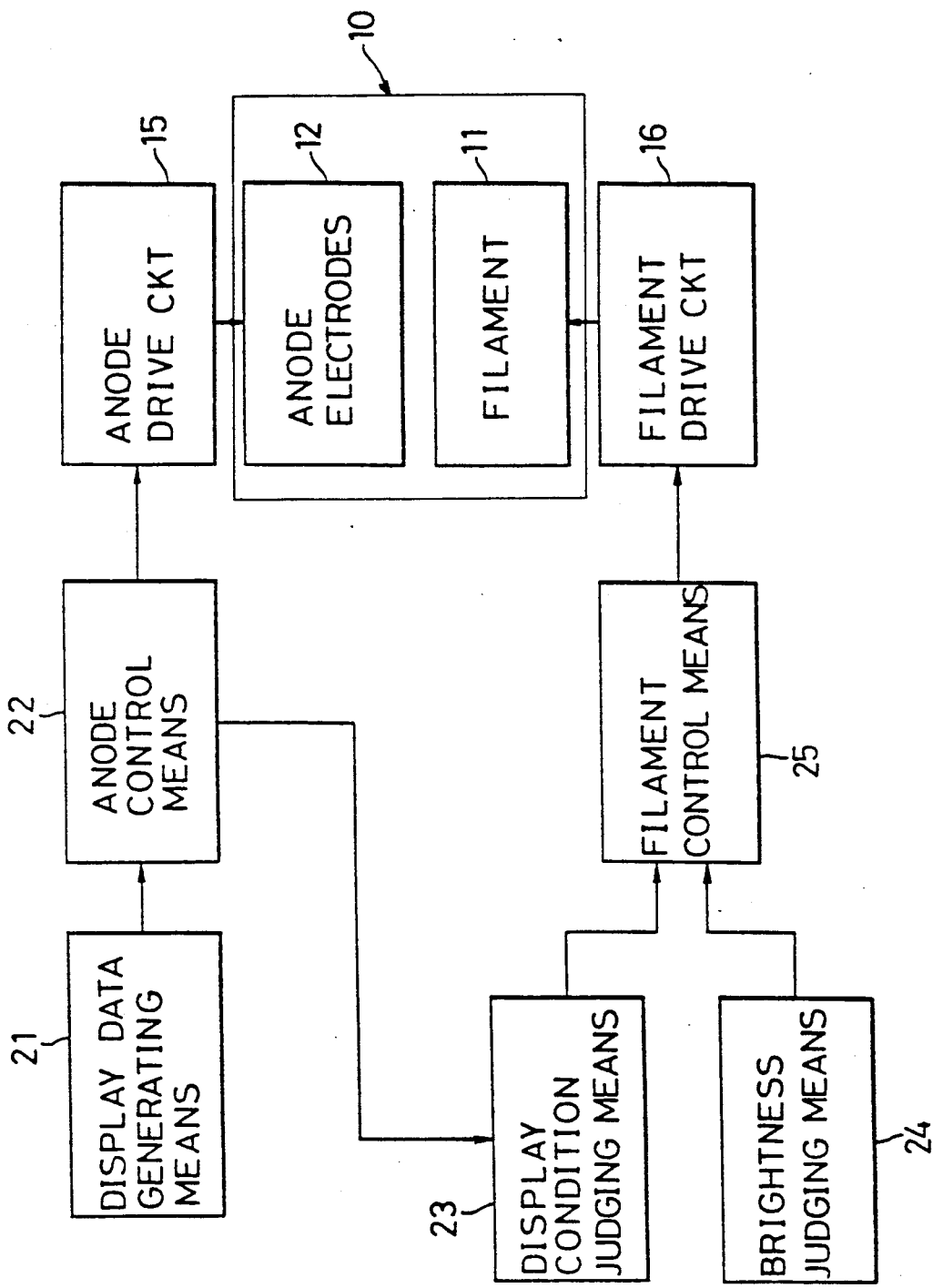
FIG. 1 is a schematic circuit block diagram of a display system provided in accordance with the present invention.

FIG. 1 shows a fundamental construction of a display system for a vehicle, provided in accordance with the present invention. In FIG. 1, a fluorescent display tube 10 is mounted within a cabin or compartment of the vehicle and is disposed in such a position that the fluorescent display tube 10 can be viewed by the driver. The fluorescent display tube 10 comprises a filament 11 coated with an electron-emitting substance, and a plurality of anode electrodes 12 each coated with a fluorescent substance. Connected to the plurality of anode electrodes 12 is an anode drive circuit 15 for selectively applying a positive voltage to the anode electrodes 12. Connected to the filament 11 is a filament drive circuit 16 for supplying electric current to the filament 11 to heat it. When the filament 11 is heated, the electron-emitting substance coated on the filament 11 emits the electrons, and the thus emitted electrons move toward selected one or more of the anode electrodes 12 to which a positive voltage has been applied, so that the electrons collide with the fluorescent substance coated on such selected anode electrodes 12. As a result, the fluorescent substance is excited to emit visible rays of light to make a display.

The display system also comprises a display data generating means 21, an anode control means 22, a display condition judging means 23, a brightness judging means 24 and a filament control means 25.

In accordance with display data generated by the display data generating means 21, the anode control means 22 selects one or more of the anode electrodes 12, and outputs a control signal to the anode drive circuit 15, this control signal being representative of an instruction for applying positive voltage to the selected anode electrodes 12. When the anode drive circuit 15 receives this control signal, this circuit 15 applies positive voltage to the selected anode electrodes 12. In contrast, when the anode drive circuit 15 does not receive this control signal, this circuit 15 does not supply the positive voltage to any of the anode electrodes 12. The display condition judging means 23 judges whether or not the anode control means 22 outputs the above control signal, that is, whether or not the fluorescent display tube 10 is to make a display. The brightness judging means 24 judges whether or not the surroundings of the fluorescent display tube 10 is dark or bright, that is, whether it is in the daytime or in the night. The filament control means 25 is responsive to signals or information, outputted from the display condition judging means 23 and the brightness judging means 24, to control the filament drive circuit 16.

The operation of the filament control means 25 will now be described in detail. When the display condition judging means 23 judges that the display is to be made, the filament control means 25 outputs a control signal for energizing the filament 11, regardless of the judgment of the brightness judging means 24. In order to cause the fluorescent display tube 10 to make a display, the energization and heating (glowing) of the filament 11 as well as the application of the positive voltage to selected one or more of the anode electrodes 12 are necessary.

Even when the display condition judging means 23 judges that the display is not to be made, the filament control means 25 outputs the control signal for energizing the filament 11, when the brightness judging means 24 judges that the surroundings of the fluorescent display tube 10 are bright. As a result, the filament 11 is heated and is ready for the display. Thereafter, when the fluorescent display tube 10 is decided to make a display, (that is, the positive voltage is applied to selected ones of the anode electrodes 12), a sufficient amount of the electrons are immediately emitted from the electron-emitting substance coated on the filament 11 which has been preheated, and these electrons move toward the selected anode electrodes 12 to collide with the fluorescent substance coated thereon, so that the fluorescent substance emits visible rays of light to make the display. Therefore, a clear display can be obtained from the beginning, and the driver can easily recognize such display. Even when the filament 11 is glowing at red heat in the daytime, the filament 1 is not conspicuous since the surroundings are bright.

When the display condition judging means 23 judges that the fluorescent display tube 10 is not to make a display and also when the brightness judging means 24 judges that the surroundings of the fluorescent display tube 10 are dark, the filament control means 25 ceases to output the control signal, thus stopping the energization of the filament 10. Therefore, when the vehicle runs in the night, the filament 10 is not glowing at red heat in the non-display condition, so that the filament 10 is not an eyesore to the driver. Thereafter, when the positive voltage is supplied to selected ones of the anode electrodes 12, a sufficient amount of the electrons are not emitted until the filament 11 glows at red heat and reaches a predetermined temperature, so that the fluorescent substance on the selected anode electrodes 12 emits weak visible light. Thus, at first, the fluorescent display tube 10 makes a display with such weak light, and then the intensity of the light gradually increases to make the display clearer. Therefore, when the vehicle runs in the night, the fluorescent display tube 10 gives a less stimulus to the eyes of the driver which have been accustomed to the darkness.

In a modified form of the invention, when the brightness judging means 24 judges that the surroundings of the fluorescent display tube 10 are bright, the filament control means 25 outputs the control signal for energizing the filament 11 regardless of the judgment of the display condition judging means 23.

Figure 2:
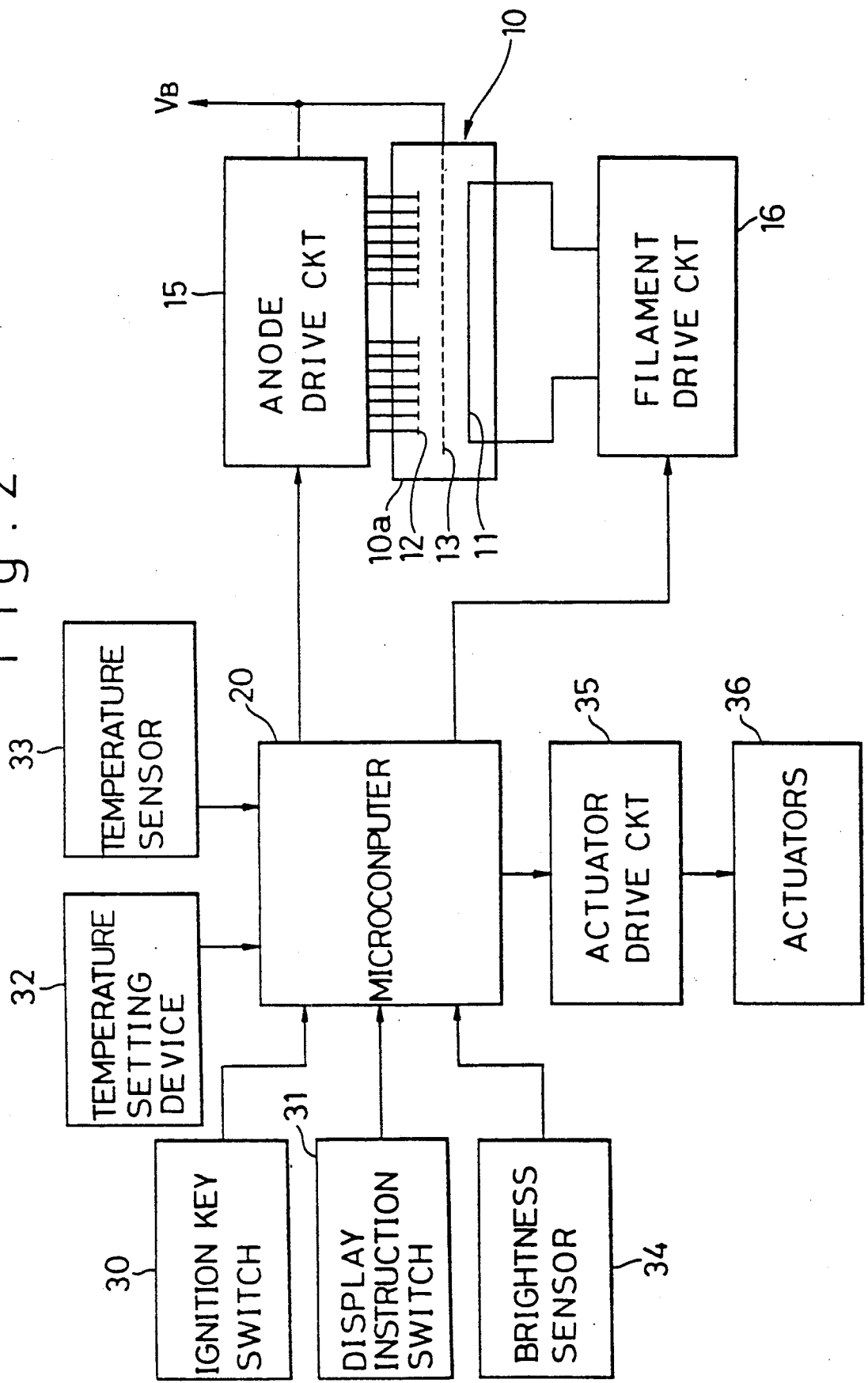
FIG. 2 is a circuit block diagram of a modified display system used in combination with an air conditioner used in a vehicle.

FIG. 2 shows an air conditioner incorporating a display system according to the present invention, the air conditioner being mounted on a vehicle. The air conditioner comprises a microcomputer 20. When an ignition key switch 3 is turned on, the microcomputer 20 is supplied with a voltage, that is, powered, to initiate its operation. ON-OFF signals from a display instruction switch 31 and other switches (not shown) are adapted to be inputted into the microcomputer 20 via a digital interface (not shown). Analog signals from a temperature setting device 32, a temperature sensor 33 for detecting the temperature within a cabin or compartment of the vehicle, a brightness sensor 34 and other sensors (not shown) are adapted to be inputted into the microcomputer 20 via an interface including analog-to-digital (A/D) converters (not shown), such other sensors including one for detecting the temperature of the ambient atmosphere. The brightness sensor 34 comprises a phototransistor, and a circuit for converting an electric current, flowing through the phototransistor, into a voltage. Thus, the brightness sensor 34 outputs a voltage corresponding to the amount of light received by the brightness sensor 34. The brightness sensor 34 may be mounted either externally or internally of the vehicle cabin. The brightness sensor 34 detects the brightness inside or outside of the vehicle cabin, and therefore substantially detects the brightness of the surroundings of a fluorescent display tube 10.

A plurality of actuator drive circuits 35 are connected to the microcomputer 20. A plurality of actuators 36 are connected to the actuator drive circuits 35, respectively. Here, the actuators 36 are an actuator for an intake door, an actuator for an air-mix door, a compressor, a blower fan, and etc.

The fluorescent display tube 10 in FIG. 2 is shown in more detail than that shown in FIG. 1. Those parts of FIG. 2 corresponding to those of FIG. 1 are denoted by the same reference numerals, respectively. The fluorescent display tube 10 comprises a sealed container 10a. A filament 10 is mounted on the front side of the container 10a, and two groups of anode electrodes 12 mounted on the rear side of the container 10a, each group consisting of seven anode electrodes 12. With this construction, the fluorescent display tube 10 can display the set temperature of the air conditioner in terms of a number of two ciphers. A grid 13 is interposed between the filament 11 and the anode electrodes 12. The grid 13 is always supplied with a positive voltage $V_B$. An anode drive circuit 15 is responsive to a control signal from the microcomputer 20 to apply the positive voltage $V_B$ to selected some of the anode electrodes 12. The microcomputer 20 also outputs a control signal for energizing the filament 11. This control signal is in the form of a rectangular wave in which a low level (zero volt) and a high level (5 volts) alternate, this control signal having a frequency, for example, of 20 KHz. A filament drive circuit 16 converts this rectangular wave into an alternating voltage of a high frequency, so that an alternating current flows through the filament 11 to heat it.

As is clear from the foregoing, the microcomputer 20 has substantially the functions of the anode control means 22 and filament control means 25 shown in FIG. 1.

Figure 3:
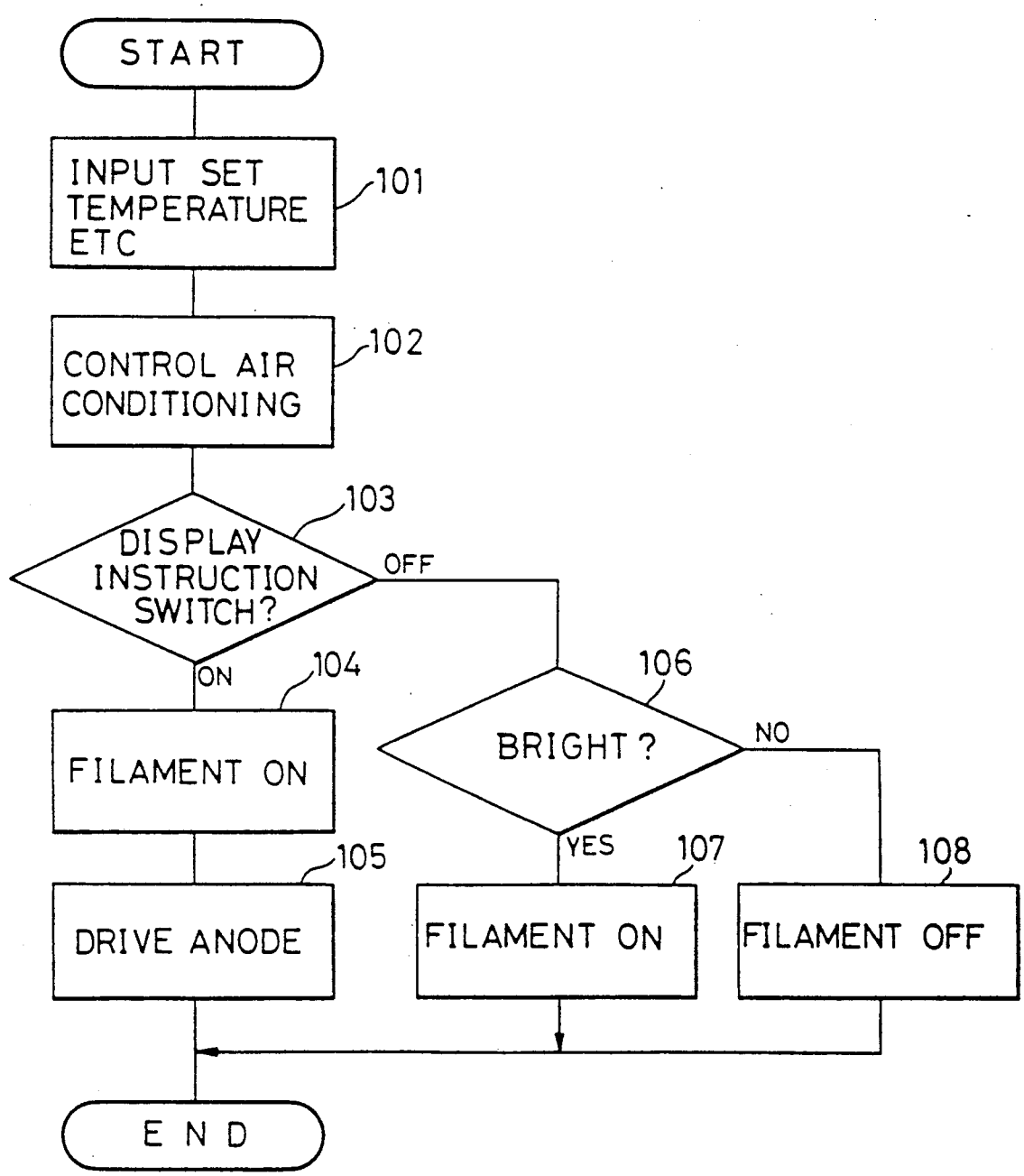
FIG. 3 is a flow chart of a program for performing the operation of the display system of FIG. 2 under the control of a microcomputer.

A program shown in FIG. 3 is periodically executed under the control of the microcomputer 20. First, in Step 101, a set temperature information from the temperature setting device 32, a cabin temperature information from the temperature sensor 33, a brightness information from the brightness sensor 34, and other information are inputted into the microcomputer 20. In the next Step 102, the air conditioning is controlled. More specifically, computation is carried out based on the set temperature information, the cabin temperature information and other information, and the microcomputer feeds the control signals respectively to the drive circuits 35 for the actuators 36 for actuating the intake door, the air mix door, the blower fan, the compressor, etc.

In the next Step 103, it is judged whether the display instruction switch 31 is in the ON-state or the OFF-state. If it is judged that this switch 31 is in the ON-state, the program proceeds to Step 104 in which the microcomputer 20 feeds to the filament drive circuit 16 the control signal for energizing the filament 11. Then, in the next Step 105, some of the anode electrodes 12 are selected in accordance with the above set temperature information, and the control signal for applying the voltage to the selected anode electrodes 12 is fed to the anode drive circuit 15, so that the set temperature is displayed in the fluorescent display tube 10 in terms of a number of two ciphers, and the program is finished.

If it is judged in the above Step 103 that the display instruction switch 31 is in the OFF-state, the program proceeds to Step 106 in which it is judged whether the brightness detected by the brightness sensor 34 reaches a predetermined level or not. When it is judged that the brightness reaches the predetermined level so that the vehicle cabin is sufficiently bright, the program proceeds to Step 107 in which the control signal for energizing the filament 11 is outputted, and the program is finished. If it is judged in the above Step 106 that the brightness does not reach the predetermined level so that the vehicle cabin is dark, the program proceeds to Step 108 in which the outputting of the control signal for energizing the filament 11 is stopped, and the program is finished.

As is clear from the foregoing, the step 103 (judgment of ON-OFF condition of the display instruction switch 31) of the above program executed by the microcomputer 20 corresponds to the display condition judging means 23 of FIG. 1. Also, the above Step 106 (judgment of brightness detected by the brightness sensor 34) corresponds to the brightness judging means 24 of FIG. 1.

The brightness sensor 34 of FIG. 2 may have a comparator function. In this case, when the brightness reaches the predetermined level, the brightness sensor 34 outputs a high-level detection signal to the microcomputer 20. In contrast, when the brightness is below the predetermined level, the brightness sensor 34 outputs a low-level signal to the microcomputer 20.

Figure 4:
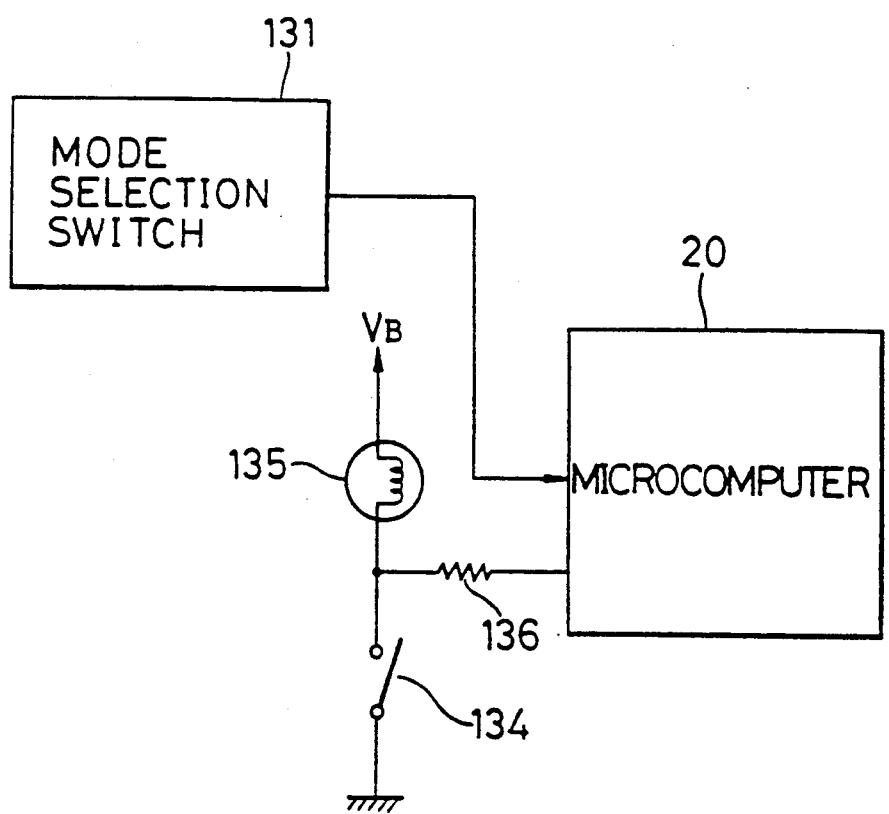
FIG. 4 is a fragmentary block diagram of another modified display system.

FIG. 4 shows a modified form of the invention. More specifically, instead of the display instruction switch 31 of FIG. 2, a mode selection switch 131 is connected to the microcomputer 20. Also, instead of the brightness sensor 34 of FIG. 2, a lamp switch 134 is connected to the microcomputer 20. The remainder of this modified construction is the same as that of the construction of FIG. 2, and therefore will not be described. The mode selection switch 131 determines whether the air conditioning under the control of the microcomputer 20 is carried out in a normal control mode or a simplified control mode, and outputs an instruction signal representative of a selected one of these two control modes. When the instruction signal representative of the normal control mode is fed from the mode selection switch 131 to the microcomputer 20, the actuators are controlled in the same manner as described above in the preceding embodiment. On the other hand, when the microcomputer 20 receives the instruction signal representative of the simplified control mode, for example, the air intake door is so positioned as to introduce the ambient air into the air conditioner, and the air mix door is so operated as to control the ratio of that part of the ambient air passing through a heater core to that part of the ambient air not passing through the heater core. The lamp switch 134 is used to turn on and off head lamps 135 of the vehicle. An ON-OFF signal from the lamp switch 134 is inputted to the microcomputer 20 via an input resistor 136.

In the embodiment of FIG. 4, the microcomputer 20 controls the fluorescent display tube 10 in the following manner. When the microcomputer 20 receives the normal control mode instruction from the mode selection switch 131, the microcomputer 20 outputs the control signal for energizing the filament 11, and also outputs the control signal for applying the voltage to selected some of the anode electrodes. On the other hand, when the microcomputer 20 receives the simplified control mode instruction, the outputting of the control signal for applying the voltage to the selected anode electrodes is stopped to stop the display. Also, in this simplified control mode, the filament is controlled in accordance with the ON and OFF states of the lamp switch 134. More specifically, when the lamp switch 134 is in the OFF state, it is judged that the present time is in the daytime, so that the filament is energized. On the other hand, when the lamp switch 134 is in the ON state, it is judged that the present time is in the night, so that the energization of the filament is stopped.

While the present invention has been specifically shown and described herein, the invention itself is not to be restricted to the exact showing of the drawings and the description thereof, and various modifications can be made. For example, in order to indicate the running condition of the air conditioner, the cabin temperature and the conditions of the various actuators can be displayed in the fluorescent tube.

What is claimed is:

1. A display system for use in a vehicle, comprising:
  (a) a fluorescent display tube including a filament coated with an electron-emitting substance, and anode electrodes each coated with a fluorescent substance, the electrons being emitted from said electron-emitting substance when said filament glows;
  (b) means for generating display data;
  (c) a filament drive circuit for energizing said filament to cause the same to glow;
  (d) anode control means for selecting one or more of said anode electrodes in accordance with said display data to output a first control signal;
  (e) an anode drive circuit responsive to said first control signal for applying a positive voltage to said selected anode electrodes, so that the electrons emitted from said electron-emitting substance move toward said selected anode electrodes to collide with said fluorescent substance on said selected anode electrodes to produce visible rays of light, thereby causing said fluorescent display tube to make a display;
  (f) display condition judging means for judging whether or not said anode control means is outputting said first control signal;
  (g) brightness judging means for judging whether the surroundings of said fluorescent display tube are bright or dark; and
  (h) filament control means for outputting to said filament drive circuit a second control signal for energizing said filament, (i) said filament control means outputting said second control signal when said display condition judging means judges that said anode control means is outputting said first control signal and/or when said brightness judging means judges that the surroundings of said fluorescent display tube are bright, (ii) said filament control means ceasing to output said second control signal when said display condition judging means judges that said anode control means does not output said first control signal and at the same time when said brightness judging means judges that the the surroundings of said fluorescent display tube are dark.

2. A display system for use in combination with an air conditioner used in a vehicle, comprising:
  (a) a fluorescent display tube including a filament coated with an electron-emitting substance, and anode electrodes each coated with a fluorescent substance, the electrons being emitted from said electron-emitting substance when said filament glows;
  (b) means for generating data representative of the condition of the operation of the air conditioner;
  (c) a filament drive circuit for energizing said filament to cause the same to glow;
  (d) display instruction means for outputting a display instruction signal;
  (e) anode control means responsive to said display instruction signal during the operation of the air conditioner so as to select one or more of said anode electrodes in accordance with said data to output a first control signal;
  (f) an anode drive circuit responsive to said first control signal for applying a positive voltage to said selected anode electrodes, so that the electrons emitted from said electron-emitting substance move toward said selected anode electrodes to collide with said fluorescent substance on said selected anode electrodes to produce visible rays of light, thereby causing said fluorescent display tube to display the condition of the operation of the air conditioner;

(g) display condition judging means for judging whether or not said display instruction means is outputting said display instruction signal;

(h) brightness judging means for judging whether the surroundings of said fluorescent display tube are bright or dark; and (i) filament control means for outputting to said filament drive circuit a second control signal for energizing said filament, (i) said filament control means outputting said second control signal when said display condition judging means judges that said display instruction means is outputting said display instruction signal and/or when said brightness judging means judges that the surroundings of said fluorescent display tube are bright, (ii) said filament control means ceasing to output said second control signal when said display condition judging means judges that said display instruction means does not output said display instruction signal and at the same time when said brightness judging means judges that the surroundings of said fluorescent display tube are dark.

3. A display system according to claim 2, in which said brightness judging means comprises a brightness sensor mounted on the vehicle; when the amount of light received by said sensor is above a predetermined level, said brightness judging means judging that the surroundings of said fluorescent display tube are bright; and when the amount of light received by said sensor is not above the predetermined level, said brightness judging means judging that said surroundings are dark.

4. A display system according to claim 2, in which said brightness judging means comprises a switch for turning on and off a head lamp of the vehicle; when said switch is in the OFF state, said brightness judging means judging that the surroundings of said fluorescent display tube are bright, and when said switch is in the ON state, said brightness judging means judging that said surroundings are dark.

* * * * *